United States Patent
Sagong et al.

(10) Patent No.: US 9,825,744 B2
(45) Date of Patent: Nov. 21, 2017

(54) METHOD AND APPARATUS FOR TRANSMITTING/RECEIVING SIGNAL BY USING MULTIPLE MODULATION AND CODING SCHEMES IN WIRELESS COMMUNICATION SYSTEM

(71) Applicant: Samsung Electronics Co., Ltd., Suwon-si, Gyeonggi-do (KR)

(72) Inventors: Min Sagong, Suwon-si (KR); Chi-Woo Lim, Suwon-si (KR); Kyung-Whoon Cheun, Seoul (KR); Sung-Nam Hong, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 14/256,336

(22) Filed: Apr. 18, 2014

(65) Prior Publication Data
US 2014/0314005 A1 Oct. 23, 2014

(30) Foreign Application Priority Data
Apr. 18, 2013 (KR) ........................ 10-2013-0042834

(51) Int. Cl.
*H04L 5/00* (2006.01)
*H04L 27/00* (2006.01)
(Continued)

(52) U.S. Cl.
CPC .......... *H04L 5/005* (2013.01); *H04L 27/0008* (2013.01); *H04L 5/0023* (2013.01);
(Continued)

(58) Field of Classification Search
None
See application file for complete search history.

(56) References Cited

U.S. PATENT DOCUMENTS 6,591,084 B1 * 7/2003 Chuprun ............ G06K 13/0825
455/3.05
6,993,001 B1 * 1/2006 Polan .................... H04W 16/12
370/335

(Continued)

FOREIGN PATENT DOCUMENTS

EP     2 493 251 A1   8/2012
WO   2011/100520 A1   8/2011

OTHER PUBLICATIONS

FQAM : A Modulation Scheme for Beyond 4G Cellular Wireless Communication Systems Sungnam Hong, Min Sagong, Chiwoo Lim, Kyungwhoon Cheun, and Sunghye Cho; Samsung Electronics Co., Ltd., Suwon, Republic of Korea; Globecom 2013 Workshop—Emerging Technologies for LTE-Advanced and Beyond-4G.*

(Continued)

*Primary Examiner* — Hassan Kizou
*Assistant Examiner* — Deepa Belur
(74) *Attorney, Agent, or Firm* — Jefferson IP Law, LLP

(57) ABSTRACT

A method of transmitting a signal using a plurality of modulation and coding schemes by a transmitter in a wireless communication system is provided. The method includes when a position of an active tone hits a position of a pilot tone of an adjacent cell, the active tone corresponding to a tone boosted through an application of a hybrid Frequency Shift Keying (FSK) and Quadrature Amplitude Modulation (QAM) Modulation (FQAM) scheme among tones included in an FQAM symbol based on the FQAM scheme in which a QAM scheme and a FSK scheme are combined, detecting two or more tones, which do not hit the position of the pilot tone among the tones included in the FQAM symbol, and transmitting signals by using the detected two or more tones.

34 Claims, 5 Drawing Sheets

(51) Int. Cl.
*H04L 27/12* (2006.01)
*H04L 27/36* (2006.01)

(52) U.S. Cl.
CPC .......... *H04L 5/0035* (2013.01); *H04L 5/0073* (2013.01); *H04L 27/12* (2013.01); *H04L 27/36* (2013.01)

(56) References Cited

U.S. PATENT DOCUMENTS

| | | | |
|---|---|---|---|
| 8,965,290 B2* | 2/2015 | Place | H04L 27/12 375/261 |
| 2003/0053549 A1* | 3/2003 | Uesugi | H04L 1/0003 375/261 |
| 2003/0093447 A1* | 5/2003 | Hwang | G01R 21/10 708/312 |
| 2004/0131125 A1* | 7/2004 | Sanderford, Jr. | H04L 5/06 375/261 |
| 2004/0198408 A1* | 10/2004 | Dillon | H04W 52/32 455/522 |
| 2005/0135324 A1* | 6/2005 | Kim | H04L 1/005 370/343 |
| 2006/0203713 A1* | 9/2006 | Laroia | H04L 5/023 370/209 |
| 2006/0215781 A1* | 9/2006 | Lee | H04L 1/0656 375/267 |
| 2006/0291577 A1 | 12/2006 | Boariu | |
| 2008/0212656 A1* | 9/2008 | Feher | H04L 27/34 375/150 |
| 2010/0040159 A1 | 2/2010 | Lee et al. | |
| 2010/0080323 A1* | 4/2010 | Mueck | H04J 11/0033 375/296 |
| 2010/0220651 A1 | 9/2010 | Chen et al. | |
| 2010/0238914 A1* | 9/2010 | Feher | H04M 11/04 370/342 |
| 2011/0194510 A1* | 8/2011 | Gaal | H04L 5/0037 370/329 |
| 2012/0087261 A1 | 4/2012 | Yoo et al. | |
| 2015/0016387 A1* | 1/2015 | Elmdahl | H04W 52/244 370/329 |
| 2015/0326422 A1* | 11/2015 | Sagong | H04L 27/38 375/298 |
| 2016/0233998 A1* | 8/2016 | Sun | H04L 5/0051 |

OTHER PUBLICATIONS

Quadrature Amplitude Modulation: From Basics to Adaptive Trellis-Coded, Turbo-Equalised and Space-Time Coded OFDM, CDMA and MC-CDMA Systems by L. Hanzo, S.X. Ng, T. Keller, W.T. Webb; 2004.*
Asma Latif, Hybrid QAM-FSK(HQFM) OFDM Transceiver with Low PAPR, Jan. 2009.
Asma Latif, Signal Properties of Hybrid LFSK Modulated MQAM (HQFM) OFDM Transceiver, Nov. 2007.
Atif et al.; A Hybrid MQAM-LFSK OFDM Transceiver with Low PAPR; IEEE; XP031074208; 2006.

* cited by examiner

METHOD AND APPARATUS FOR TRANSMITTING/RECEIVING SIGNAL BY USING MULTIPLE MODULATION AND CODING SCHEMES IN WIRELESS COMMUNICATION SYSTEM

CROSS-REFERENCE TO RELATED APPLICATION(S)

This application claims the benefit under 35 U.S.C. §119 (a) of a Korean patent application filed on Apr. 18, 2013 in the Korean Intellectual Property Office and assigned Serial number 10-2013-0042834, the entire disclosure of which is hereby incorporated by reference.

TECHNICAL FIELD

The present disclosure relates to signal transmission/reception in a wireless communication system. More particularly, the present disclosure relates to a method and an apparatus for supporting a plurality of Modulation and Coding Schemes (MCSs) in transmitting/receiving a signal.

BACKGROUND

A wireless communication system has been developed to support a higher data transmission rate in order to meet wireless data traffic demands which have continuously increased. For example, in order to increase the data transmission rate, technologies of the wireless communication system have been developed to improve spectral efficiency and increase channel capacities based on communication techniques such as an Orthogonal Frequency Division Multiplexing (OFDM) scheme or Multiple Input Multiple Output (MIMO) transmission/reception.

Meanwhile, in the wireless mobile communication system, cell-edge users experiencing a low Signal-to-Noise Ratio (SNR) of a cell boundary far from a cell center and a low Carrier-to-Interference and Noise Ratio (CINR) significantly influenced from a base station of an adjacent cell correspond to factors limiting system performance. Accordingly, technologies such as Inter-Cell Interference-Coordination (ICIC), Coordinated Multi-Points (CoMP), and interference cancellation are developed to increase transmission efficiency of the cell-edge users.

The above described technologies have been researched in the terms of interference cancellation at a receiving side rather than interference cancellation at a transmitting side. However, an improved technology which can provide optimally increased channel capacities to the users in a cell-edge area environment is required.

Further, related arts assume that interference signals have a Gaussian distribution to perform a decoding with low complexity and mainly use a Quadrature Amplitude Modulation (QAM) scheme to make an interference signal characteristic as close as possible to the Gaussian distribution. However, since channel capacity of a non-Gaussian channel is larger than channel capacity of a Gaussian channel, it is possible to obtain higher decoding performance in the non-Gaussian channel in comparison with in the Gaussian channel if the decoding is properly performed. Accordingly, a modulation scheme to make the interference signal have a non-Gaussian characteristic is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for transmitting/receiving a signal in a communication system.

Another aspect of the present disclosure is to provide a method and an apparatus for transmitting/receiving a signal to support a plurality of modulation and coding schemes in a wireless communication system.

In accordance with an aspect of the present disclosure, a method of transmitting a signal using a plurality of modulation and coding schemes by a transmitter in a wireless communication system is provided. The method includes when a position of an active tone hits a position of a pilot tone of an adjacent cell, the active tone corresponding to a tone boosted through an application of a hybrid Frequency Shift Keying (FSK) and Quadrature Amplitude Modulation (QAM) Modulation (FQAM) scheme among tones included in an FQAM symbol based on the FQAM scheme in which a QAM scheme and an FSK scheme are combined, detecting two or more tones, which do not hit the position of the pilot tone among the tones included in the FQAM symbol, and transmitting signals by using the detected two or more tones.

In accordance with another aspect of the present disclosure, a method of transmitting a signal using a plurality of modulation and coding schemes by a transmitter in a wireless communication system is provided. The method includes when a position of an active tone hits a position of a pilot tone of an adjacent cell, the active tone corresponding to a tone boosted through an application of a hybrid FQAM scheme among tones included in an FQAM symbol based on the FQAM scheme in which a QAM scheme and an FSK scheme are combined, configuring transmission power applied to the active tone as power smaller than transmission power applied to the pilot tone of the adjacent cell, and transmitting the signal by using the active tone.

In accordance with another aspect of the present disclosure, a method of transmitting a signal using a plurality of modulation and coding schemes by a transmitter in a wireless communication system is provided. The method includes when a position of an active tone hits a position of a pilot tone of an adjacent cell, the active tone corresponding to a tone boosted through an application of a hybrid FQAM scheme among tones included in an FQAM symbol based on the FQAM scheme in which a QAM scheme and an FSK scheme are combined, converting the FQAM symbol including the active tone to a QAM symbol, and transmitting the signal by using tones included in the QAM symbol.

In accordance with another aspect of the present disclosure, a method of receiving a signal using a plurality of modulation and coding schemes by a receiver in a wireless communication system is provided. The method includes receiving supplementary information for reconstruction of the signal, receiving a signal transmitted using a hybrid FSK and FQAM scheme in which a QAM scheme and an FSK scheme are combined, and reconstructing the received signal in consideration of the supplementary signal.

In accordance with another aspect of the present disclosure, an apparatus for transmitting a signal by using a plurality of modulation and coding schemes in a wireless communication system is provided. The apparatus includes a controller configured to, when a position of an active tone hits a position of a pilot tone of an adjacent cell, the active tone corresponding to a tone boosted through an application of a hybrid FQAM scheme among tones included in an FQAM symbol based on the FQAM scheme in which a QAM scheme and an FSK scheme are combined, detect two or more tones, which do not hit the position of the pilot tone among the tones included in the FQAM symbol, and a transceiver configured to transmit signals by using the detected two or more tones.

In accordance with another aspect of the present disclosure, an apparatus for transmitting a signal by using a plurality of modulation and coding schemes in a wireless communication system is provided. The apparatus includes a controller configured to, when a position of an active tone hits a position of a pilot tone of an adjacent cell, the active tone corresponding to a tone boosted through an application of a hybrid FQAM scheme among tones included in an FQAM symbol based on the FQAM scheme in which a QAM scheme and an FSK scheme are combined, configure transmission power applied to the active tone as power smaller than transmission power applied to the pilot tone of the adjacent cell, and a transceiver configured to transmit the signal by using the active tone.

In accordance with another aspect of the present disclosure, an apparatus for transmitting a signal by using a plurality of modulation and coding schemes in a wireless communication system is provided. The apparatus includes a controller configured to, when a position of an active tone hits a position of a pilot tone of an adjacent cell, the active tone corresponding to a tone boosted through an application of a hybrid FQAM scheme among tones included in an FQAM symbol based on the FQAM scheme in which a QAM scheme and an FSK scheme are combined, convert the FQAM symbol including the active tone to a QAM symbol, and a transceiver configured to transmit the signal by using tones included in the QAM symbol.

In accordance with another aspect of the present disclosure, an apparatus for receiving a signal by using a plurality of modulation and coding schemes in a wireless communication system is provided. The apparatus includes a transceiver configured to receive supplementary information for reconstruction of the signal and receives a signal transmitted using a hybrid FQAM scheme in which a QAM scheme and an FSK scheme are combined, and a controller configured to reconstruct the received signal in consideration of the supplementary signal.

The present disclosure provides a method of addressing a pilot contamination problem between adjacent cells and can increase accuracy of an average channel estimation in an overall system and increase throughput in terms of a network through the method.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure described below describe a technology to combine a bandwidth-efficient modulation scheme and a power-efficient modulation scheme in transmission/reception of a wireless communication system. Specifically, the various embodiments describe a method and an apparatus for operating a hybrid Frequency Shift Keying (FSK) and Quadrature Amplitude Modulation (QAM) Modulation (FQAM) modulation scheme in which QAM and FSK are combined. The FQAM modulation scheme supports both of a characteristic of the QAM modulation scheme corresponding to high spectral efficiency and a characteristic of the FSK scheme in which the interference signal has the non-Gaussian characteristic.

Figures 1A, 1B, 1C:
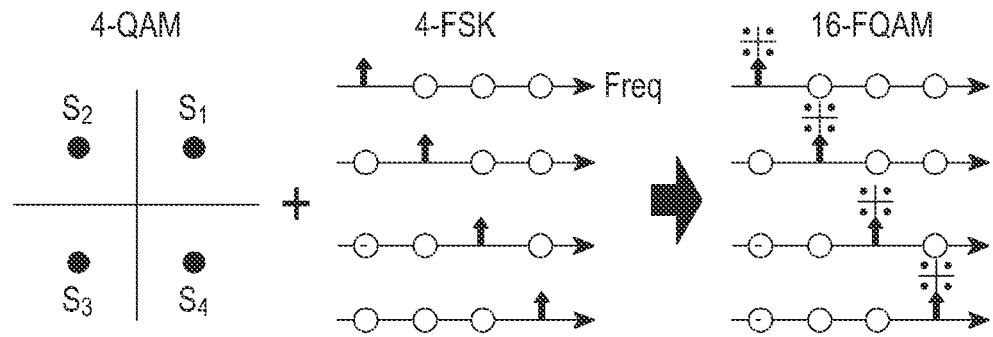
FIGS. 1A. 1B, and 1C are views illustrating a basic concept of a Frequency Shift Keying (FSK) and Quadrature Amplitude Modulation (QAM) Modulation (FQAM) according to an embodiment of the present disclosure.

FIGS. 1A, 1B, and 1C are views illustrating a basic concept of the FQAM according to an embodiment of the present disclosure.

As illustrated in FIG. 1, the FQAM scheme refers to a modulation scheme including both the QAM scheme characteristic and the FSK scheme characteristic, and the following description will be made based on an example of 16-FQAM in which 4-ary QAM, that is, 4-QAM (QPSK) and 4-FSK using four modulation frequencies are combined.

Referring to FIG. 1A, a constellation of 4-QAM includes four signal points $S_1$, $S_2$, $S_3$, and $S_4$ to which modulated digital signals can be mapped. The signal points have the same size and include complex modulation symbols (a, a), (−a, a), (−a, −a), and (a, −a) having a phase difference of 90 degrees from each other. For example, information bits 00, 01, 10, and 11 may be mapped to the signal points.

Referring to FIG. 1B, in the 4-FSK, information bits are loaded to one of four different modulation frequencies and then transmitted. For example, for the information bits 00, 01, 10, and 11, signal pulses $F_1$, $F_2$, $F_3$, and $F_4$ may be transmitted.

Referring to FIG. 1C, the 16-FQAM in which the 4-QAM and the 4-FSK are combined transmits the four signal points $S_1$, $S_2$, $S_3$, and $S_4$ in one of the four modulation frequencies $F_1$, $F_2$, $F_3$, and $F_4$. Accordingly, the 16-FQAM can transmit sixteen pieces of information. That is, it is possible to transmit four information bits through one modulation frequency.

As described above, the FQAM scheme refers to a modulation scheme in which information bits are loaded using the constellation and frequency positions. Although FIGS. 1A, 1B, and 1C illustrate a single-tone FQAM, a multi-tone FQAM in which bit information is loaded using various patterns of a plurality of frequencies may be implemented. Hereinafter, it should be understood that the FQAM includes both the single-tone FQAM and the multi-tone FQAM.

Figure 2:
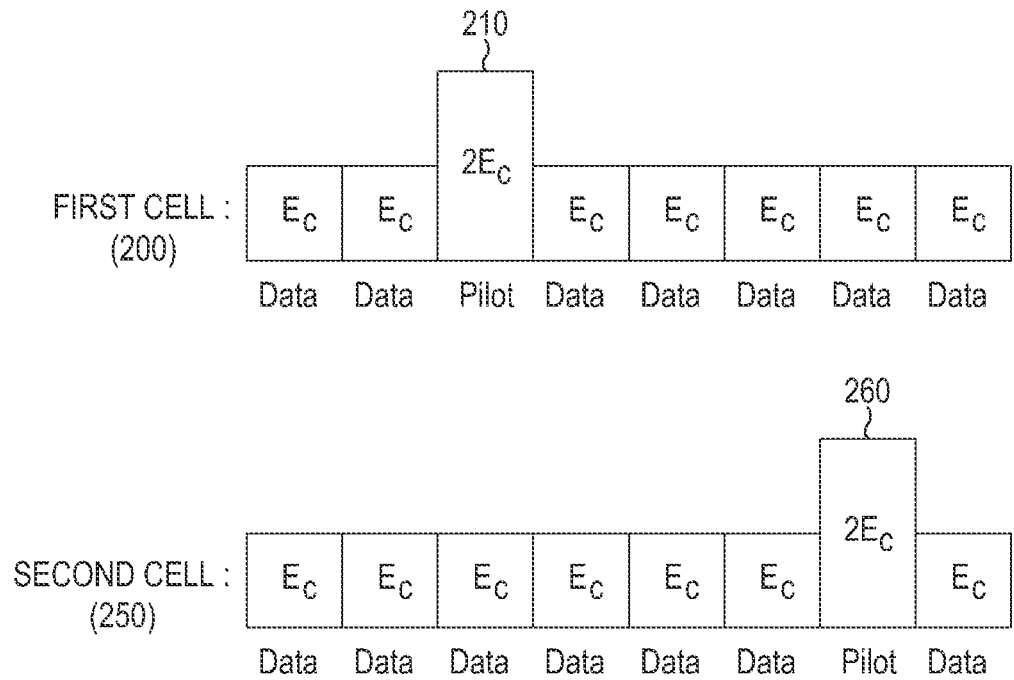
FIG. 2 illustrates an example of an operation of a pilot signal between adjacent cells in a general cellular communication system according to an embodiment of the present disclosure.

FIG. 2 illustrates an example of an operation of a pilot signal between adjacent cells in a general cellular communication system according to an embodiment of the present disclosure.

FIG. 2 describes an operation in which a Base Station (BS) transmits a pilot signal and a data signal by using eight subcarriers in a first cell 200 and a second cell 250, as an example.

Referring to FIG. 2, the BS boosts a pilot signal having relatively higher importance than a data signal and transmits the boosted pilot signal. That is, the BS transmits a pilot subcarrier carrying the pilot signal with higher power, for example, double power ($2E_c$) in comparison with a data subcarrier carrying the data signal.

However, if a position of a pilot tone hits an adjacent cell even though the BS boosts the pilot signal and transmits the boosted pilot signal, pilot signals of the respective cells give interference to each other and thus an advantage due to transmission of the boosted pilot signal disappears.

Accordingly, in most of the existing multi-cell wireless communication systems, positions of pilot tones (or signals) between adjacent cells are designed not to overlap each other as illustrated in FIG. 2. That is, the multi-cell wireless communication system is designed such that the pilot signal is transmitted through a third subcarrier 210 of a related subcarrier block in the first cell 200 and the pilot signal is transmitted through a sixth subcarrier 260 of a related subcarrier block in the second cell 250.

Figures 3A, 3B:
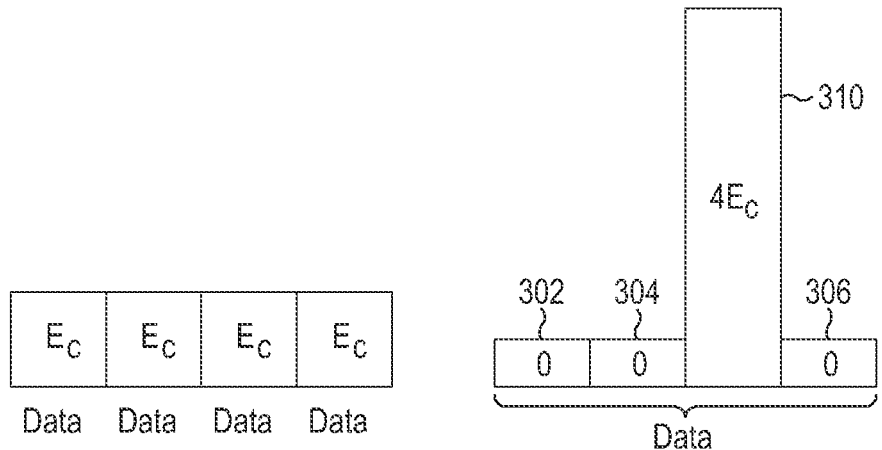
FIGS. 3A and 3B illustrate power distribution per symbol according to a modulation scheme applied to a general communication system according to an embodiment of the present disclosure.

FIGS. 3A and 3B illustrate power distribution per symbol according to a modulation scheme applied to a general communication system according to an embodiment of the present disclosure.

Referring to FIG. 3A, power distribution of a symbol according to the QAM scheme is illustrated, in which it is noted that power allocated to each tone is uniform. That is, the BS transmits each of four data tones included in one symbol with the same power, that is, $E_c$.

Referring to FIG. 3B, power distribution of a symbol according to the FQAM scheme in which the QAM scheme and the FSK scheme are combined, that is, power distribution of an FQAM symbol is illustrated, in which it is noted that power allocated to each tone is not uniform and power of tones included in one symbol is concentrated to one tone. That is, the BS transmits one tone 310 boosted with power corresponding to M tones included in one symbol and the remaining tones 302, 304, and 306 do not transmit anything. In an embodiment of the present disclosure described below, a tone having boosted power through application of the FQAM scheme is defined as an active tone. Further, when it is assumed that a number of tones included in one symbol is 4, transmission power of the active tone 310 is $4E_c$.

The tones 302, 304, and 306 which do not transmit anything do not cause pilot contamination to other cells even though they hit pilot tones of adjacent cells. However, the active tone 310 causes pilot contamination to another cell if the active tone 310 hits a pilot tone of an adjacent cell. Pilot contamination means that a pilot tone transmitted from an adjacent cell is not properly received due to the active tone 310 and thus a channel estimation error increases.

An embodiment of the present disclosure described below discusses a method of addressing the pilot contamination problem between adjacent cells. In the following description, for the convenience of description, the method of addressing the pilot contamination is divided into a method of avoiding the pilot contamination and a method of attenuating the pilot contamination.

Figures 4A, 4B:
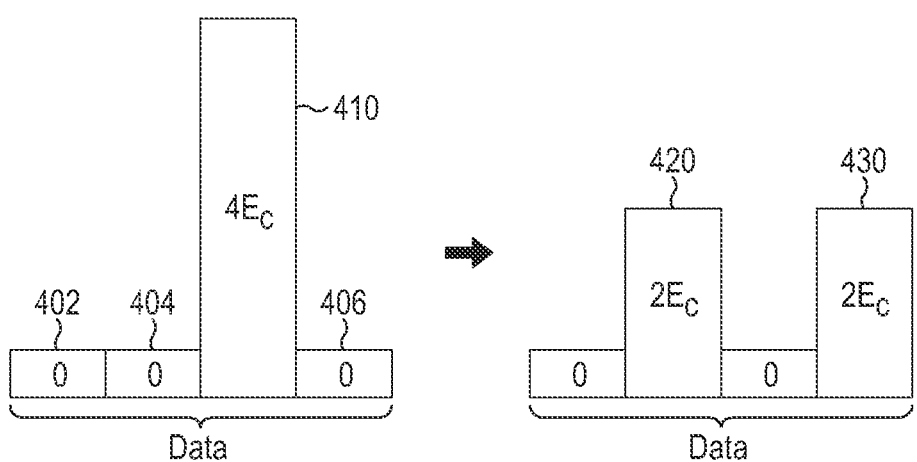
FIGS. 4A and 4B illustrate an example of an operation of an active tone to avoid pilot contamination between adjacent cells in a communication system according to an embodiment of the present disclosure.

FIGS. 4A and 4B illustrate an example of an operation of the active tone to avoid the pilot contamination between adjacent cells in a communication system according to an embodiment of the present disclosure.

Referring to FIGS. 4A and 4B, the BS loads a data signal only on an active tone 410 and transmits the active tone 410 and the remaining tones 402, 404, and 406 do not transmit anything in the transmission of an FQAM symbol as illustrated in FIG. 4A. However, if a position of the active tone 410 hits a position of a pilot tone of an adjacent cell, the active tone 410 causes pilot contamination to another cell.

Accordingly, if the position of the active tone 410 hits the position of the pilot tone of the adjacent cell, the BS loads data signals on tones of the FQAM symbol located at positions which do not hit the pilot tone of the adjacent cell and transmits the tones. That is, the BS loads a data signal of the active tone 410, which hits the pilot tone of the adjacent cell, on tones, which do not hit the pilot tone of the adjacent cell, for example, tones 420 and 430 located on both sides of the active tone 410 and transmits the tones 420 and 430 as illustrated in FIG. 4B. Accordingly, the BS can avoid the pilot contamination between adjacent cells.

An example of the method of avoiding the pilot contamination will be described below.

If the position of the active tone of the FQAM symbol does not hit the position of the pilot tone of the adjacent cell, the BS transmits a data signal based on a single-tone FQAM symbol, that is, a primary constellation using one active tone 410 as illustrated in FIG. 4A. At this time, transmission power of the active tone 410 is $4E_c$.

However, when the position of the active tone of the FQAM symbol hits the position of the pilot tone of the adjacent cell, the BS transmits the data signal based on a multi-tone FQAM symbol in which positions of the tones do not hit the position of the pilot tone of the adjacent cell, that is, a secondary constellation using at least two tones. In FIG. 4B, transmission of the data signal using the two active tones 420 and 430 is described as an example, and transmission power of each of the active tones 420 and 430 is $2E_c$.

As described above, the BS uses the multi-tone FQAM symbol when the position of the active tone of the FQAM symbol hits the position of the pilot tone of the adjacent cell, so that the pilot contamination generated through the use of the single-tone FQAM symbol can be avoided. Although the above example has described a number of used constellations as two, the number of constellations may be three or more according to an operation example.

Meanwhile, when the BS transmits the data signal based on the secondary constellation, the BS may additionally transmit supplementary information related to the secondary constellation to a terminal in order to reduce reception complexity of the terminal. Of course, the supplementary information may not be transmitted. The supplementary information may include a plurality of pieces of type information and the plurality of pieces of type information may include different pieces of information according to an application example. That is, the supplementary information may include at least one of, for example, information indicating positions of the active tones used in the secondary constellation, information indicating positions of pilot tones of the adjacent cell, and information indicating that the secondary constellation is used. The information indicating the positions of the active tones used in the secondary constellation and the information indicating the positions of the pilot tones of the adjacent cell may be transmitted through, for example, a Physical Downlink Control CHannel (PDCCH). The supplementary information including different pieces of information according to an application example will be described in more detail further below with reference to FIG. 8.

The terminal receives the supplementary information transmitted from the BS, calculates Log Likelihood Ratio (LLR) values of signals to be recovered in consideration of the supplementary information, and decodes the LLR values according to a predetermined decoding scheme, so as to recover received signals. The LLR values may be calculated by Equation (1) below. Equation (1) below corresponds to an equation of calculating an LLR of a nonbinary decoder.

$$L_k^{CM}(y[k],H[k]) = (L_0 L_1 \ldots L_{M-1}) \quad \text{Equation (1)}$$

where $L_1 = \ln(f_{Y[k]}(y[k]|\hat{H}[k],s[k]=x_1))$

In Equation (1), y[k] denotes a k-th received symbol, s[k] denotes a k-th transmitted symbol, H[k] denotes a k-th channel coefficient, f( ) denotes a probability density function (pdf), $\hat{H}$[k] denotes a k-th channel coefficient estimated by a channel estimation method, and $x_1$ denotes an 1-th candidate symbol. The pdf may be modeled in various forms. In an embodiment of the present disclosure, a Complex Generalized Gaussian (CGG) pdf is used for Equation (2).

$$f_{Y[k]}(y[k]|\hat{H}[k],s[k]) = \frac{a}{2\pi\beta^2\Gamma(2/\alpha)}\exp\left(-\left(\frac{|y[k]|-\hat{H}[k]s[k]|}{\beta}\right)^\alpha\right) \quad \text{Equation (2)}$$

In Equation (2), α and β denote statistic parameters modeled based on an assumption that an interference component has CGG distribution in an interference channel, and may be estimated as, for example, Equation (3) below.

$$\begin{cases} \alpha = \dfrac{\ln(3^6/2^{10})}{\ln\left(\dfrac{(E[|\hat{J}[k]|])^2}{E[|\hat{J}[k]|^2]} - \dfrac{\pi}{4} + \dfrac{9}{2^{3.5}}\right) + \ln\left(\dfrac{3}{2\sqrt{2}}\right)}, \\ \beta = \dfrac{\Gamma\left(\dfrac{2}{\alpha}\right)}{\Gamma\left(\dfrac{3}{\alpha}\right)} E[|\hat{J}[k]|] \\ \hat{J}[k] = y[k] - \hat{H}[k]\hat{s}[k] \end{cases} \quad \text{Equation (3)}$$

In Equation (3), ŝ[k] denotes a transmitted symbol simply estimated by a hard decision method and Ĵ[k] denotes an estimated interference signal. As described α may be obtained from second order statistics of a value excluding a signal component to be received from a reception signal and β may be obtained from primary statistics of a value excluding a signal component from a reception signal.

That is, if the terminal receives the information indicating the positions of the active tones used in the secondary constellation through the PDCCH, the terminal calculates an LLR of a signal received from the active tone used in the primary constellation by using the primary constellation and calculates LLRs of signals received from the active tones used in the secondary constellation by using the secondary constellation.

Further, if the terminal receives the information indicating the position of the pilot tone of the adjacent cell through the PDCCH from the BS, the terminal calculates LLRs of signals received from the tones, which do not hit the position of the pilot tone of the adjacent cell, by using the primary constellation and calculates an LLR of a signal received from a signal, which hits the position of the pilot tone of the adjacent cell, by using both the primary constellation and the secondary constellation. In this case, a number of candidate symbols become double a number of used constellations, that is, two times.

Further, if the terminal receives the information indicating that the secondary constellation is used from the BS, the terminal calculates LLRs of signals received from all tones included in the corresponding symbol by using both the primary constellation and the secondary constellation.

FIGS. 4A and 4B described a case where the FQAM symbol consists of four data tones as an example. However, the method of avoiding the pilot contamination described in FIGS. 4A and 4B can be applied only to the FQAM symbol including three or more tones and cannot be applied to the FQAM symbol including two tones. Accordingly, when the FQAM symbol consists of two data tones, the method of attenuating the pilot contamination may be used instead of the method of avoiding the pilot contamination in FIGS. 4A and 4B. The method of attenuating the pilot contamination will be described in more detail with reference to FIGS. 5A, 5B, 6A, and 6B.

Figures 5A, 5B:
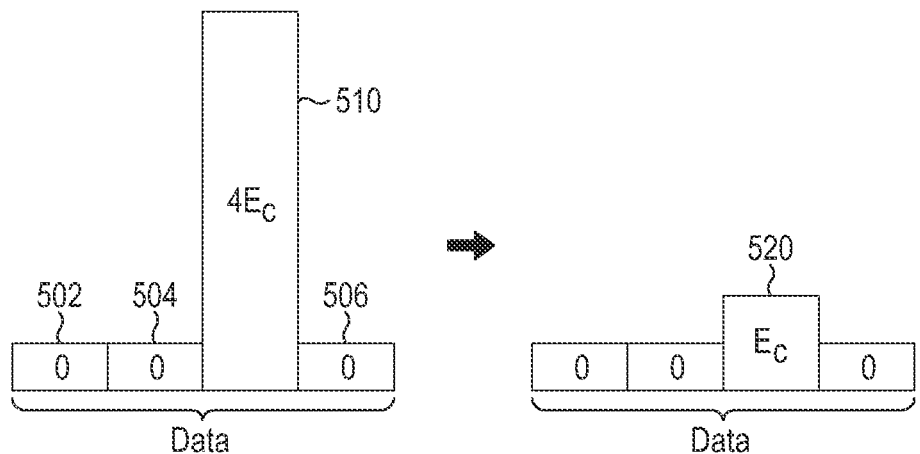
FIGS. 5A and 5B illustrate an example of an operation of an active tone to attenuate pilot contamination between adjacent cells in a communication system according to a first embodiment of the present disclosure.

FIGS. 5A and 5B illustrate an example of an operation of the active tone to attenuate the pilot contamination between adjacent cells in a communication system according to a first embodiment of the present disclosure.

Referring to FIGS. 5A and 5B, the BS loads a data signal only on an active tone 510 and transmits the active tone 510 and the remaining tones 502, 504, and 506 do not transmit anything in the transmission of an FQAM symbol as illustrated in FIG. 5A. However, if a position of the active tone 510 hits a position of a pilot tone of an adjacent cell, the active tone 510 causes the pilot contamination to another cell.

Accordingly, when the position of the active tone 510 hits the position of the pilot tone of the adjacent cell, the BS transmits the active tone 510 with reduced transmission power. That is, as illustrated in FIG. 5B, the BS transmits an active tone 520 with reduced power, thereby attenuating the pilot contamination between adjacent cells.

An example of the method of attenuating the pilot contamination will be described below.

If the position of the active tone 510 does not hit the position of the pilot tone of the adjacent cell, the BS transmits a data signal by using the active tone 510 as illustrated in FIG. 5A. At this time, transmission power of the active tone 510 is 4Ec.

However, if the position of the active tone 510 hits the position of the pilot tone of the adjacent cell, the BS reduces the transmission power of the active tone 520 to a value smaller than the transmission power of the pilot tone of the adjacent cell and transmits the active tone 520 with the reduced transmission power as illustrated in FIG. 5B. Here, it is assumed that the transmission power of the pilot tone of the adjacent cell is $2E_c$ and the BS transmits the active tone 520 with transmission power ($1E_c$) smaller than the transmission power $2E_c$ of the pilot tone of the adjacent cell. As described above, the BS transmits the active tone 520 of the FQAM symbol with the transmission power smaller than the transmission power of the pilot tone of the adjacent cell, and accordingly, can attenuate the pilot contamination generated if the active tone 520 hits the pilot tone of the adjacent cell.

Figures 6A, 6B:
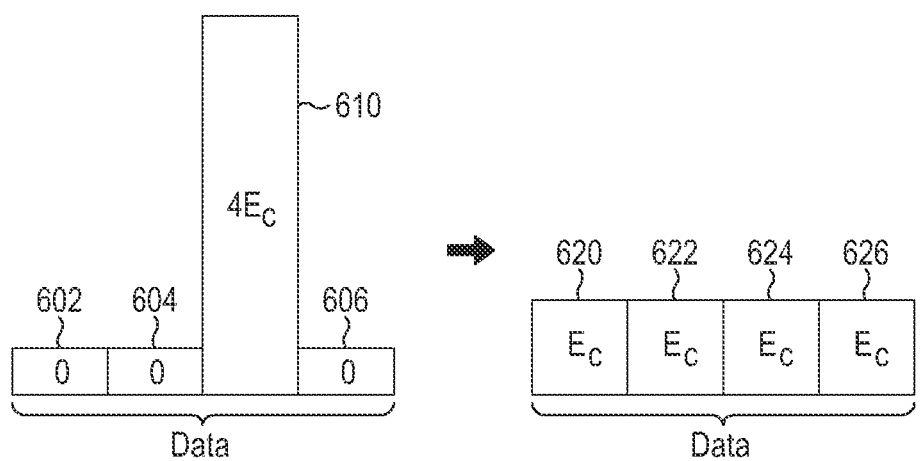
FIGS. 6A and 6B illustrate an example of an operation of an active tone to attenuate pilot contamination between adjacent cells in a communication system according to a second embodiment of the present disclosure.

FIGS. 6A and 6B illustrate an example of an operation of the active tone to attenuate the pilot contamination between adjacent cells in a communication system according to a second embodiment of the present disclosure.

Referring to FIGS. 6A and 6B, the BS loads a data signal only on an active tone 610 and transmits the active tone 610 and the remaining tones 602, 604, and 606 do not transmit anything in the transmission of an FQAM symbol as illustrated in FIG. 6A. However, if a position of the active tone 610 hits a position of a pilot tone of an adjacent cell, the active tone 610 causes the pilot contamination to another cell.

Accordingly, when the position of the active tone 610 of the FQAM symbol hits the position of the pilot tone of the adjacent cell, the BS converts the FQAM symbol to a QAM symbol and transmits the QAM symbol. That is, the BS converts the FQAM symbol, in which power of tones included in the symbol is concentrated to one tone, to the QAM symbol, in which the same power is uniformly distributed to four tones 620, 622, 624, 626, and transmits the QAM symbol as illustrated in FIG. 6B, so that the pilot contamination between adjacent cells can be attenuated.

An example of the method of attenuating the pilot contamination will be described below.

If the position of the active tone 610 of the FQAM symbol does not hit the position of the pilot tone of the adjacent cell, the BS transmits a data signal by using the active tone 610 as illustrated in FIG. 6A. At this time, transmission power of the active tone 610 is $4E_c$.

However, if the position of the active tone 610 of the FQAM symbol hits the position of the pilot tone of the adjacent cell, the BS converts the FQAM symbol to the QAM symbol and transmits the data signal by using the four tones 620, 622, 624, 626 as illustrated in FIG. 6B. At this time, since the transmission power of each of the four tones 620, 622, 624, 626 transmitting the data signal is $1E_c$ which is ¼ of the related-art transmission power $4E_c$, the transmission power is smaller than transmission power $2E_c$ of the pilot tone of the adjacent cell. As described above, the BS can attenuate the pilot contamination generated when the active tone of the FQAM symbol hits the pilot tone of the adjacent cell by converting the FQAM symbol to the QAM symbol consisting of tones transmitted with transmission power smaller than transmission power of the pilot tone of the adjacent cell.

In the above description, the method of avoiding the pilot contamination and the method of attenuating the pilot contamination have been discussed above separately. However, the method of avoiding the pilot contamination and the method of attenuating the pilot contamination can be used together.

For example, when a number of adjacent cells (or adjacent BSs) providing interference to a serving cell is abnormally large, the method of avoiding the pilot contamination of moving the position of the active tone to a position, which does not hit the position of the pilot tone of the adjacent cell, cannot remove the pilot contamination between all adjacent cells. In this case, the serving cell (or serving BS) can use the method of avoiding the pilot contamination and the method of attenuating the pilot contamination together.

That is, the serving cell BS classifies adjacent cells according to importance. The serving cell BS applies the method of avoiding the pilot contamination provided by the present disclosure to a cell having relatively high importance and applies the method of attenuating the pilot contamination provided by the present disclosure to a cell having relatively low importance. The importance of the adjacent cells may be configured when the system is designed and determined in consideration of intensity of reception power of the pilot signal or a number of terminals providing a communication service. That is, highest importance is assigned to a cell having highest intensity of reception power of the pilot signal or a cell providing a communication service to a largest number of terminals.

Figure 7:
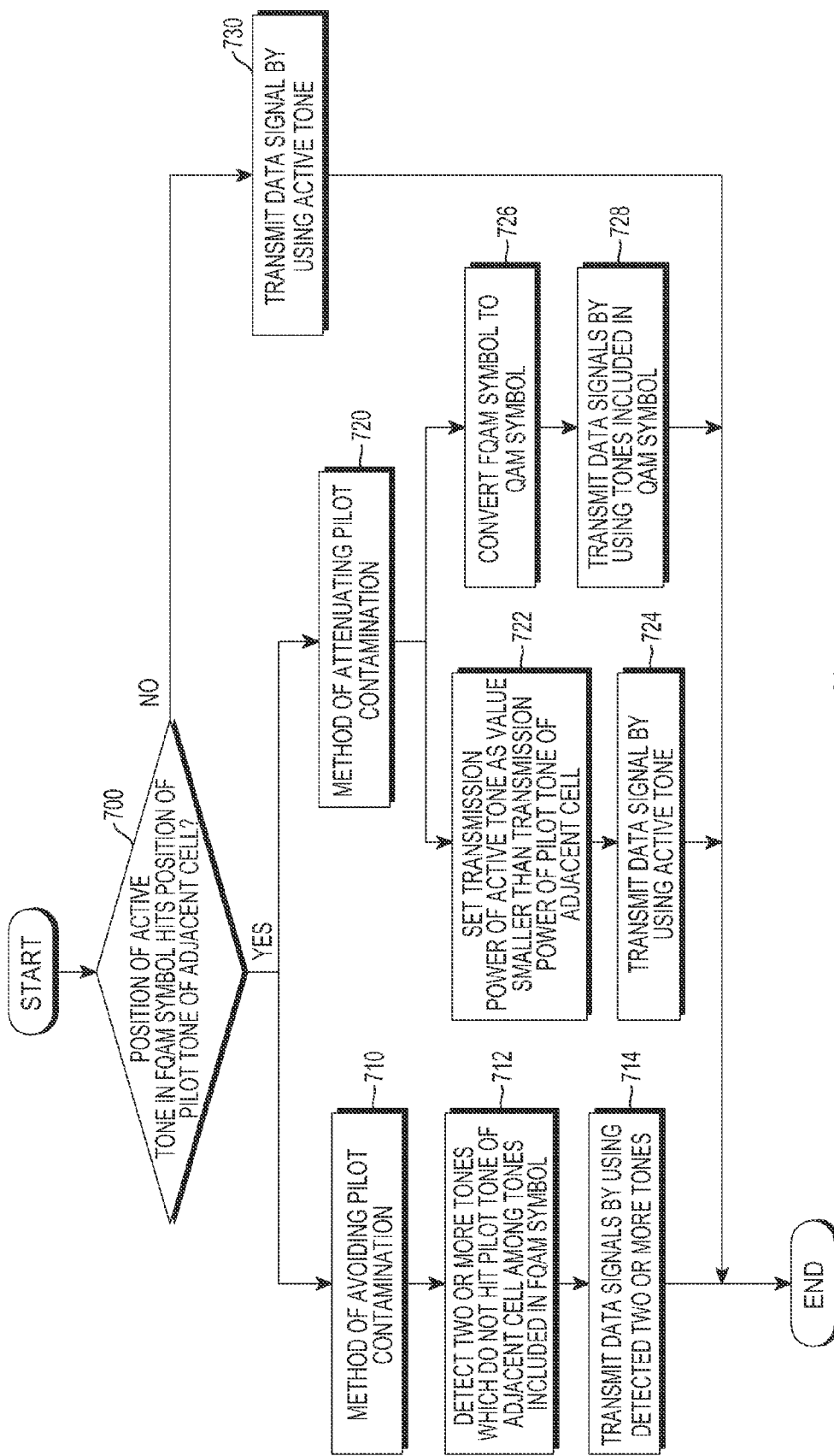
FIG. 7 is a flowchart illustrating an operation in which a Base Station (BS) addresses the pilot contamination between adjacent cells in the communication system according to an embodiment of the present disclosure.

FIG. 7 is a flowchart illustrating an operation in which the BS addresses the pilot contamination between adjacent cells in the communication system according to an embodiment of the present disclosure.

Referring to FIG. 7, the BS identifies whether the position of the active tone of the FQAM symbol hits the position of the pilot tone of the adjacent cell in operation 700. When the active tone hits the pilot tone, the BS applies the method of avoiding the pilot contamination in operation 710 or applies the method of attenuating the pilot contamination in operation 720. It is assumed that the BS already knows the position of the pilot tone. That is, the BS can know a position of a pilot tone mapped into each of adjacent cell IDentifiers (IDs) through the adjacent cell ID. However, when the active tone does not hit the pilot tone, the BS transmits the data signal by using the active tone in operation 730.

The method of avoiding the pilot contamination in operation 710 will be described first. The BS detects two or more tones which do not hit the pilot tone of the adjacent cell among tones included in the FQAM symbol in operation 712 and proceeds to operation 714. In operation 714, the BS may detect the two or more tones based on positions of tones prearranged between the BS and the terminal, or temporarily detect the two or more tones and then transmit information related to the detected tones to the terminal.

In operation 714, the BS transmits the data signal by using the detected two or more tones. As described above, when the active tone of the FQAM symbol hits the pilot tone of the adjacent cell, the BS can avoid the pilot contamination by transmitting the data signal by using tones, which do not hit the pilot tone of the adjacent cell among the tones included in the FQAM symbol.

Next, the method of attenuating the pilot contamination in operation 720 will be described. The BS sets transmission power of the active tone of the FQAM symbol as a value smaller than transmission power of the pilot tone of the adjacent cell in operation 722 and proceeds to operation 724. In operation 724, the BS transmits the data signal by using the active tone having the reduced transmission power.

Alternatively, the BS converts the FQAM symbol to the QAM symbol in operation 726 and transmits the data signal by using tones included in the converted QAM symbol in operation 728.

Figure 8:
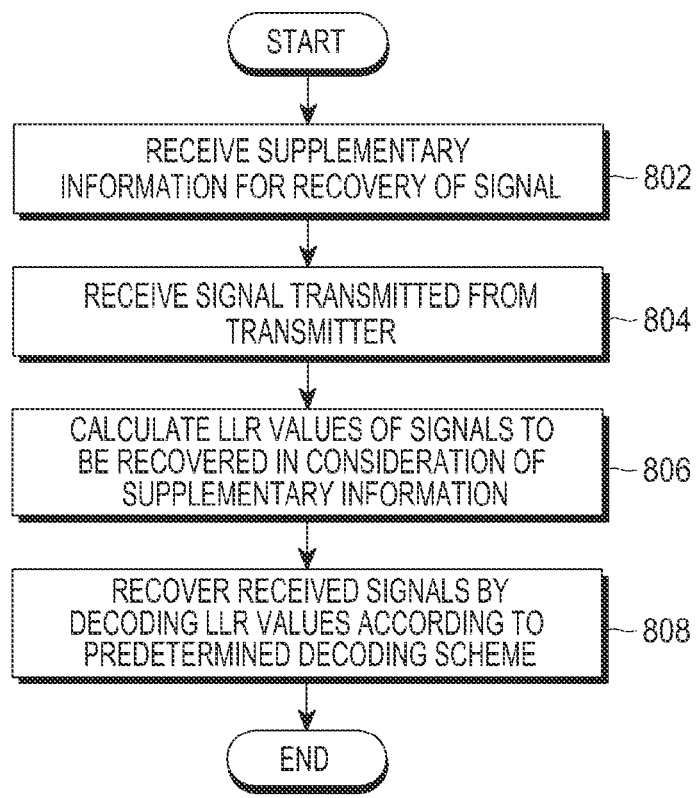
FIG. 8 illustrates an order of an operation in which a terminal receives a signal transmitted through the flowchart of FIG. 7 in the communication system according to an embodiment of the present disclosure.

FIG. 8 illustrates an order of an operation in which the terminal receives the signal transmitted through the flowchart of FIG. 7 in the communication system according to an embodiment of the present disclosure.

Referring to FIG. 8, the terminal receives supplementary information for recovering the signal from the BS in operation 802 and proceeds to operation 804. The supplementary information may include a plurality of pieces of type information and the plurality of pieces of type information may include different pieces of information according to an application example. In the following description, it is assumed that the supplementary information includes type 0, type 1, and type 2.

Type 0 refers to supplementary information according to the method of avoiding the pilot contamination. If the BS loads the data signal on tones located at positions which do not hit the pilot tone of the adjacent cell, among the tones included in the FQAM symbol, and transmits the tones, the supplementary information corresponding to type 0 is transmitted to the terminal. The supplementary information according to type 0 includes at least one of a set index indicating a constellation, information indicating positions of the active tones according to the set index, information indicating the position of the pilot tone of the corresponding adjacent cell, and information indicating that the constellation is used.

Type 1 refers to supplementary information according to the method of attenuating the pilot contamination. When the BS transmits the active tone which hits the pilot tone of the adjacent cell with reduced transmission power, the supplementary information corresponding to type 1 is transmitted to the terminal. The supplementary information according to type 1 includes at least one of a Power Down (PD) factor indicating a ratio between the related-art transmission power and the reduced transmission power of the active tone, information indicating the position of the active tone having the reduced transmission power, information indicating the position of the pilot tone of the corresponding adjacent cell, and information indicating that the BS transmits the active tone with the reduced transmission power. For example, a PD factor of the active tone 520 of FIG. 5B may be ¼.

Type 2 refers to supplementary information according to the method of attenuating the pilot contamination. When the BS converts the FQAM symbol to the QAM symbol and transmits the QAM symbol, the supplementary information corresponding to type 2 is transmitted to the terminal. The supplementary information according to type 2 includes at least one of information indicating the position of the active tone in the FQAM symbol, information indicating the position of the pilot tone of the corresponding adjacent cell, and information indicating that the FQAM symbol is converted to the QAM symbol.

The terminal receives the signal transmitted from a transmitter, that is, the BS in operation 804 and proceeds to operation 806. It is assumed that the signal transmitted from the BS is the aforementioned signal transmitted in operations 714, 724, 728, and 730 of FIG. 7. The terminal calculates LLR values of signals to be recovered in consideration of the supplementary information received in operation 806. That is, when the terminal receives the information indicating the positions of the active tones used in the secondary constellation among the supplementary information corresponding to type 0, the terminal calculates an LLR of a signal received from the active tone used in the primary constellation by using the primary constellation and calculates an LLR of signals received from the active tones used in the secondary constellation by using the secondary constellation.

Further, when the terminal receives the information indicating the position of the pilot tone of the adjacent cell among the supplementary information corresponding to one of types 0, 1, and 2 from the BS, the terminal calculates LLRs of signals received from the tones, which do not hit the position of the pilot tone of the adjacent cell, by using the primary constellation and calculates an LLR of a signal received from a signal, which hits the position of the pilot tone of the adjacent cell, by using both the primary constellation and the secondary constellation.

In addition, when the terminal receives the information indicating that the secondary constellation is used among the supplementary information corresponding to type 0 from the BS, the terminal calculates LLRs of signals received from all tones included in the corresponding symbol by using both the primary constellation and the secondary constellation.

Thereafter, the terminal recovers the received signal by decoding the calculated LLR values according to a predetermined decoding scheme in operation 808.

Figures 9, 10:
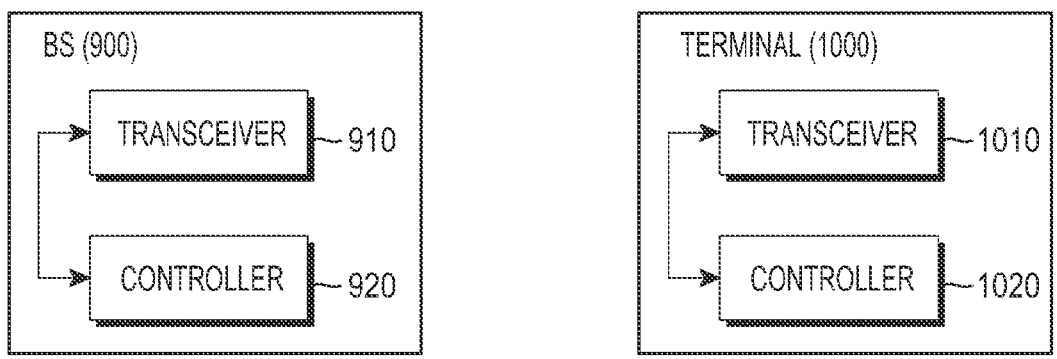
FIG. 9 is a block diagram illustrating a Base Station (BS) device addressing the pilot contamination between adjacent cells in the communication system according to an embodiment of the present disclosure.
FIG. 10 is a block diagram illustrating a terminal device receiving a signal transmitted from the BS device illustrated in FIG. 9 in the communication system according to an embodiment of the present disclosure.

FIG. 9 is a block diagram illustrating a BS device addressing the pilot contamination between adjacent cells in the communication system according to an embodiment of the present disclosure.

Referring to FIG. 9, a BS 900 includes a transceiver 910 and a controller 920.

The controller 920 of the BS 900 identifies whether the position of the active tone of the FQAM symbol hits the position of the pilot tone of the adjacent cell. When the active tone hits the pilot tone, the controller 920 applies the method of avoiding the pilot contamination or the method of attenuating the pilot contamination. It is assumed that the BS 900 has already known the position of the pilot tone. That is, the BS can know a position of a pilot tone mapped into each of adjacent cell IDs through the adjacent cell ID. At this time, when the active tone does not hit the pilot tone, the BS 900 transmits the data signal through the transceiver 910 by using the active tone.

The method of avoiding the pilot contamination will be first described. The controller 920 of the BS 900 detects two or more tones, which do not hit the pilot tone of the adjacent cell, among the tones included in the FQAM symbol and transmits the data signal through the transceiver 910 by using the detected two or more tones. As described above, when the active tone hits the pilot tone, the BS 900 can avoid the generation of the pilot contamination by transmitting the data signal by using the tones, which do not hit the pilot tone of the adjacent cell, among the tones included in the FQAM symbol.

Next, the method of attenuating the pilot contamination will be described. The controller 920 of the BS 900 configures transmission power of the active tone of the FQAM symbol as a value smaller than transmission power of the pilot tone of the adjacent cell and transmits the data signal through the transceiver 910 by using the active tone having the reduced transmission power.

Further, the controller 920 of the BS may convert the FQAM symbol to the QAM symbol and then transmit the data signal through the transceiver 910 by using tones included in the converted QAM symbol.

FIG. 10 is a block diagram illustrating a terminal device receiving the signal transmitted from the BS device illustrated in FIG. 9 in the communication system according to an embodiment of the present disclosure.

Referring to FIG. 10, a terminal 1000 includes a transceiver 1010 and a controller 1020.

The transceiver 1010 of the terminal 1000 receives supplementary information for recovering the signal from the BS and receives the signal transmitted from the BS. The supplementary information may include at least one of, for example, information indicating positions of the active tones used in the secondary constellation, information indicating a position of pilot tone of the adjacent cell, and information indicating that the secondary constellation is used. Further, the supplementary information may include a plurality of pieces of type information and the plurality of pieces of type information may include different pieces of information according to an application example. Since the information included in the supplementary information according to each type has been described in detail with reference to FIG. 8, a detailed description thereof will be omitted.

The controller 1020 of the terminal 1000 calculates LLR values of signals to be recovered in consideration of the received supplementary information. That is, when the controller receives the information indicating the positions of the active tones used in the secondary constellation from the BS, the controller calculates an LLR of a signal received from the active tone used in the primary constellation by using the primary constellation and calculates an LLR of signals received from the active tones used in the secondary constellation by using the secondary constellation.

Further, the controller receives the information indicating the position of the pilot tone of the adjacent cell from the BS, the controller calculates LLRs of signals received from the tones, which do not hit the position of the pilot tone of the adjacent cell, by using the primary constellation and calculates an LLR of a signal received from a signal, which hits the position of the pilot tone of the adjacent cell, by using both the primary constellation and the secondary constellation.

In addition, when the controller 1020 of the terminal 1000 receives the information indicating that the secondary constellation is used from the BS, the controller calculates LLRs of signals received from all tones included in the corresponding symbol by using both the primary constellation and the secondary constellation. Thereafter, the controller 1020 recovers the received signal by decoding the calculated LLR values according to a predetermined decoding scheme.

Although the concrete embodiment has been described in the detailed description of the present disclosure, the present disclosure may be modified in various forms without departing from the scope of the present disclosure. Therefore, the scope of the present disclosure should not be defined as being limited to the various embodiments, but should be defined by the appended claims and equivalents thereof.

Further, the method and the apparatus for transmitting/receiving the signal by using the plurality of modulation and coding schemes according to the embodiment of the present disclosure can be implemented in the form of hardware, software, or a combination thereof. Any such software may be stored, for example, in a volatile or non-volatile non-transitory storage device such as a Read Only Memory (ROM), a memory such as a Random Access Memory (RAM), a memory chip, a memory device, or an Integrated Circuit (IC), or an optical or magnetic recordable and machine (e.g., computer) readable medium such as a Compact Disc (CD), a Digital Versatile Disc (DVD), a magnetic disk, or a magnetic tape, regardless of its ability to be erased or its ability to be re-recorded. Also, it will be appreciated that a graphic screen updating method according to the present disclosure may be implemented by a computer or a portable terminal which includes a controller and a memory, in which the memory may be an example of a non-transitory storage medium that is readable by a machine that is suitable for storing one or more programs that include instructions for implementing certain embodiments of the present disclosure.

Accordingly, the present disclosure includes a program including a code for implementing the apparatus or the method defined in the appended claims of the present specification and a non-transitory machine (computer)-readable storage medium for storing the program. Further, the program may be electronically transferred by a predetermined medium such as a communication signal transferred through a wired or wireless connection, and the present disclosure appropriately includes equivalents of the program.

The apparatus for transmitting/receiving the signal by using the plurality of modulation and coding schemes according to the embodiment of the present disclosure may receive the program from a program providing apparatus connected to the apparatus wirelessly or through a wire and store the received program. The program supply apparatus may include a program that includes instructions to execute certain embodiments of the present disclosure, a memory that stores information or the like required for certain embodiments of the present disclosure, a communication unit that conducts wired or wireless communication with the electronic apparatus, and a control unit that transmits a corresponding program to a transmission/reception apparatus in response to the request from the electronic apparatus or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of transmitting a signal using a frequency and quadrature amplitude modulation (FQAM) scheme based on a QAM scheme and a FSK scheme by a transmitter in a wireless communication system, the method comprising:
   determining whether a position of an active tone of a serving cell overlaps with a position of a pilot tone of another cell, the active tone having boosted power among tones included in a FQAM symbol;
   if the position of the active tone of the serving cell overlaps with the position of the pilot tone of the other cell, selecting at least two tones, which do not overlap with the position of the pilot tone among the tones included in the FQAM symbol; and
   transmitting the signal on the selected at least two tones.

2. The method of claim 1, wherein transmission power applied to each of the at least two tones is smaller than transmission power applied to the pilot tone of the other cell.

3. The method of claim 1, further comprising transmitting at least one of information indicating positions of the at least two tones, information indicating the position of the pilot tone of the other cell, and information indicating that the at least two tones are used.

4. The method of claim 1, further comprising:
   classifying adjacent cells, which provide interference to the serving cell, based on importance of each of the adjacent cells,
   wherein, if a first adjacent cell of the adjacent cells has relatively high importance, the signal is transmitted on the selected at least two tones, and
   wherein, if the first adjacent cell has relatively low importance, the signal is transmitted on an active tone having transmission power smaller than transmission power of a pilot tone of the first adjacent cell or tones included in a QAM symbol converted from the FQAM symbol.

5. The method of claim 4, wherein the importance of each of the adjacent cells is determined on the transmission power of the pilot tone of the first adjacent cell and a number of terminals managed by the first adjacent cell.

6. A method of transmitting a signal using a frequency and quadrature amplitude modulation (FQAM) scheme based on a QAM scheme and a FSK scheme by a transmitter in a wireless communication system, the method comprising:
   determining whether a position of an active tone of a serving cell overlaps with a position of a pilot tone of another cell, the active tone having boosted power among tones included in a FQAM symbol;
   if the position of the active tone of the serving cell overlaps with the position of the pilot tone of the other cell, setting transmission power applied to the active tone to be smaller than transmission power applied to the pilot tone of the other cell;
   transmitting the signal on the active tone which is set the transmission power; and
   transmitting at least one information of a power down (PD) factor indicating a ratio between the transmission power applied to the active tone having boosted power based on the FQAM scheme and the transmission power applied to the active tone used for transmission of the signal, information indicating the position of the active tone used for the transmission of the signal, information indicating the position of the pilot tone of the other cell, and information indicating that the transmission power applied to the active tone is set as the power smaller than the transmission power applied to the pilot tone of the other cell.

7. The method of claim 6, further comprising:
   classifying adjacent cells, which provide interference to the serving cell, based on importance of each of the adjacent cells,
   wherein, if a first adjacent cell of the adjacent cells has relatively high importance, the signal is transmitted on at least two tones, which do not overlap with the position of the pilot tone among the tones included in the FQAM symbol, and
   wherein, if the first adjacent cell has relatively low importance, the signal is transmitted using the active tone which is set the transmission power or tones included in a QAM symbol converted from the FQAM symbol.

8. The method of claim 7, wherein the importance of each of the adjacent cells is determined based on the transmission power of the pilot tone of the first adjacent cell and a number of terminals managed by the first adjacent cell.

9. A method of transmitting a signal using a frequency and quadrature amplitude modulation (FQAM) scheme based on a QAM scheme and a FSK scheme by a transmitter in a wireless communication system, the method comprising:
   determining whether a position of an active tone of a serving cell overlaps with a position of a pilot tone of another cell, the active tone having boosted power among tones included in a FQAM symbol;
   if the position of the active tone of the serving cell overlaps with the position of the pilot tone of the other cell, converting the FQAM symbol including the active tone to a QAM symbol; and
   transmitting the signal on tones included in the QAM symbol.

10. The method of claim 9, further comprising transmitting at least one of information indicating the position of the active tone in the FQAM symbol, information indicating the position of the pilot tone of the other cell, and information indicating that the FQAM symbol is converted to the QAM symbol.

11. The method of claim 9, further comprising:
   classifying adjacent cells, which provide interference to the serving cell, based on importance of each of the adjacent cells,
   wherein, if a first adjacent cell of the adjacent cells has relatively high importance, the signal is transmitted on at least two tones, which do not overlap with the position of the pilot tone among the tones included in the FQAM symbol, and
   wherein, if the first adjacent cell has relatively low importance, the signal is transmitted on an active tone having transmission power smaller than transmission power of a pilot tone of the first adjacent cell or the tones included in the QAM symbol.

12. The method of claim 11, wherein the importance of each of the adjacent cells is determined on the transmission power of the pilot tone of the first adjacent cell and a number of terminals managed by the first adjacent cell.

13. A method of receiving a signal using a frequency and quadrature amplitude modulation (FQAM) scheme based on a QAM scheme and a FSK scheme by a receiver in a wireless communication system, the method comprising:
   receiving information related to recovery of the signal;
   receiving the signal transmitted on at least two tones; and
   recovering the received signal based on the information related to recovery, wherein the at least two tones, which do not overlap with a position of a pilot tone of another cell among tones included in a FQAM symbol, are selected if a position of an active tone of a serving cell overlaps with a position of a pilot tone of the other cell, the active tone having boosted power among tones included in the FQAM symbol.

14. The method of claim 13, the information related to recovery includes at least one of information indicating positions of active tones, information indicating a position of a pilot tone of another cell, and information indicating that the multi-tone FQAM symbol is used.

15. The method of claim 14, wherein the recovering of the received signal comprises:
if the information related to recovery includes the information indicating the positions of the active tones, calculating a log likelihood ratio (LLR) of a signal received from an active tone included in a single-tone FQAM symbol by using the active tone; and
calculating LLRs of signals received from the active tones included in the multi-tone FQAM symbol by using the active tones.

16. The method of claim 14, wherein the recovering of the received signal comprises:
if the information related to recovery includes the information indicating the position of the pilot tone of the other cell, calculating LLRs of signals received from tones, which do not overlap with the position of the pilot tone of the other cell, by using an active tone included in a single-tone FQAM symbol; and
calculating an LLR of a signal received from a tone, which overlaps with the position of the pilot tone of the other cell, by using the active tone and active tones included in the multi-tone FQAM symbol.

17. The method of claim 14, wherein the recovering of the received signal comprises:
if the information related to recovery includes the information indicating that the multi-tone FQAM symbol is used, calculating LLRs of signals received from all tones included in the FQAM symbol by using an active tone included in a single-tone FQAM symbol and active tones included in the multi-tone FQAM symbol.

18. An apparatus for transmitting a signal by using a frequency and quadrature amplitude modulation (FQAM) scheme based on a QAM scheme and a FSK scheme in a wireless communication system, the apparatus comprising:
a processor configured to:
determine whether a position of an active tone of a serving cell overlaps with a position of a pilot tone of another cell, the active tone having boosted power among tones included in a FQAM symbol, and
if the position of the active tone of the serving cell overlaps with the position of the pilot tone of the other cell, select at least two tones, which do not overlap with the position of the pilot tone among the tones included in the FQAM symbol; and
a transceiver configured to transmit the signal on the selected at least two tones.

19. The apparatus of claim 18, wherein transmission power applied to each of the at least two tones is smaller than transmission power applied to the pilot tone of the other cell.

20. The apparatus of claim 18, wherein the transceiver is further configured to transmit at least one information of information indicating positions of the at least two tones, information indicating the position of the pilot tone of the other cell, and information indicating that the at least two tones are used.

21. The apparatus of claim 18,
wherein the processor is further configured to classify adjacent cells, which provide interference to the serving cell, based on importance of each of the adjacent cells,
wherein, if a first adjacent cell of the adjacent cells has relatively high importance, the signal is transmitted on the selected at least two tones, and
wherein, if the first adjacent cell has relatively low importance, the signal is transmitted on an active tone having transmission power smaller than transmission power of a pilot tone of the first adjacent cell or tones included in a QAM symbol converted from the FQAM symbol.

22. The apparatus of claim 21, wherein the importance of each of the adjacent cells is determined based on the transmission power of the pilot tone of the first adjacent cell and a number of terminals managed by the first adjacent cell.

23. An apparatus for transmitting a signal by using a frequency and quadrature amplitude modulation (FQAM) scheme based on a QAM scheme and a FSK scheme in a wireless communication system, the apparatus comprising:
a processor configured to:
determine whether a position of an active tone of a serving cell overlaps with a position of a pilot tone of another cell, the active tone having boosted power among tones included in a FQAM symbol, and
if the position of the active tone of the serving cell overlaps with the position of the pilot tone of the other cell, set transmission power applied to the active tone to be smaller than transmission power applied to the pilot tone of the other cell; and
a transceiver configured to transmit the signal on the active tone which is set the transmission power and transmit at least one information of a power down (PD) factor indicating a ratio between the transmission power applied to the active tone having boosted power based on the FQAM scheme and the transmission power applied to the active tone used for transmission of the signal, information indicating the position of the active tone used for the transmission of the signal, information indicating the position of the pilot tone of the other cell, and information indicating that the transmission power applied to the active tone is set as the power smaller than the transmission power applied to the pilot tone of the other cell.

24. The apparatus of claim 23,
wherein the processor is further configured to classify adjacent cells, which provide interference to the serving cell, based on importance of each of the adjacent cells,
wherein, if a first adjacent cell of the adjacent cells has relatively high importance, the signal is transmitted on at least two tones, which do not overlap with the position of the pilot tone among the tones included in the FQAM symbol, and
wherein, if the first adjacent cell has relatively low importance, the signal is transmitted using the active tone which is set the transmission power or tones included in a QAM symbol converted from the FQAM symbol.

25. The apparatus of claim 24, wherein the importance of each of the adjacent cells is determined based on the transmission power of the pilot tone of the first adjacent cell and a number of terminals managed by the first adjacent cell.

26. An apparatus for transmitting a signal by using a frequency and quadrature amplitude modulation (FQAM)

scheme based on a QAM scheme and a FSK scheme in a wireless communication system, the apparatus comprising:
a processor configured to:
determine whether a position of an active tone of a serving cell overlaps with a position of a pilot tone of another cell, the active tone having boosted power among tones included in a FQAM symbol, and
if the position of the active tone of the serving cell overlaps with the position of the pilot tone of the other cell, convert the FQAM symbol including the active tone to a QAM symbol; and
a transceiver configured to transmit the signal on tones included in the QAM symbol.

27. The apparatus of claim 26, wherein the transceiver is further configured to transmit at least one information of information indicating the position of the active tone in the FQAM symbol, information indicating the position of the pilot tone of the other cell, and information indicating that the FQAM symbol is converted to the QAM symbol.

28. The apparatus of claim 26,
wherein the processor is further configured to classify adjacent cells, which provide interference to the serving cell, based on importance of each of the adjacent cells,
wherein, if a first adjacent cell of the adjacent cells has relatively high importance, the signal is transmitted on at least two tones, which do not overlap with the position of the pilot tone among the tones included in the FQAM symbol, and
wherein, if the first adjacent cell has relatively low importance, the signal is transmitted on an active tone having transmission power smaller than transmission power of a pilot tone of the first adjacent cell or the tones included in the QAM symbol.

29. The apparatus of claim 28, wherein the importance of each of the adjacent cells is determined based on the transmission power of the pilot tone of the first adjacent cell and a number of terminals managed by the first adjacent cell.

30. An apparatus for receiving a signal by using a frequency and quadrature amplitude modulation (FQAM) scheme based on a QAM scheme and a FSK scheme in a wireless communication system, the apparatus comprising:
a transceiver configured to:
receive information related to recovery of the signal, and
receive the signal transmitted on at least two tones; and
a processor configured to recover the received signal based on the information related to recovery,
wherein the at least two tones, which do not overlap with a position of a pilot tone of another cell among tones included in a FQAM symbol, are selected if a position of an active tone of a serving cell overlaps with a position of a pilot tone of the other cell, the active tone having boosted power among tones included in the FQAM symbol.

31. The apparatus of claim 30, wherein the information related to recovery includes at least one of information indicating positions of active tones, information indicating a position of a pilot tone of another cell, and information indicating that the multi-tone FQAM symbol is used.

32. The apparatus of claim 31, wherein the processor is further configured to:
if the information related to recovery includes the information indicating the positions of the active tones, calculate a log likelihood ratio (LLR) of a signal received from an active tone included in a single-tone FQAM symbol by using the active tone, and
calculate LLRs of signals received from the active tones included in the multi-tone FQAM symbol by using the active tones.

33. The apparatus of claim 31, wherein the processor is further configured to:
if the information related to recovery includes the information indicating the position of the pilot tone of the other cell, calculate LLRs of signals received from tones, which do not overlap with the position of the pilot tone of the other cell, by using an active tone included in a single-tone FQAM symbol, and
calculate an LLR of a signal received from a tone, which overlaps with the position of the pilot tone of the other cell, by using the active tone and active tones included in the multi-tone FQAM symbol.

34. The apparatus of claim 31, wherein the processor is further configured to, if the information related to recovery includes the information indicating that the multi-tone FQAM symbol is used, calculate LLRs of signals received from all tones included in the FQAM symbol by using an active tone included in a single-tone FQAM symbol and active tones included in the multi-tone FQAM symbol.

* * * * *